(No Model.)

W. A. PETRIE.
HOOK ATTACHMENT FOR DOUBLETREES.

No. 366,871.  Patented July 19, 1887.

WITNESSES:
C. Neveux
C. Sedgwick

INVENTOR:
W. A. Petrie
BY Munn & Co.
ATTORNEYS.

UNITED STATES PATENT OFFICE.

WILLIAM A. PETRIE, OF HILLSDALE, MICHIGAN.

HOOK ATTACHMENT FOR DOUBLETREES.

SPECIFICATION forming part of Letters Patent No. 366,871, dated July 19, 1887.

Application filed March 29, 1887. Serial No. 232,873. (No model.)

*To all whom it may concern:*

Be it known that I, WILLIAM A. PETRIE, of Hillsdale, in the county of Hillsdale and State of Michigan, have invented a new and useful Improvement in Swivel-Hook Attachments for Doubletrees, of which the following is a full, clear, and exact description.

This invention is designed to take the place of the usual center clevis on doubletrees; and it consists in a swivel-hook composed of two hooks on opposite sides of its body, the one a close or grab hook and the other an open one, and having combined with it a tapering eyebolt, on which it swivels, and which fits a tapering longitudinal aperture through the body of the hook and is secured by a nut to the body, while the eye of the bolt also freely engages with a staple that detachably fastens the whole to the doubletree.

Reference is to be had to the accompanying drawings, forming a part of this specification, in which similar letters of reference indicate corresponding parts in all the figures.

Figure 1:
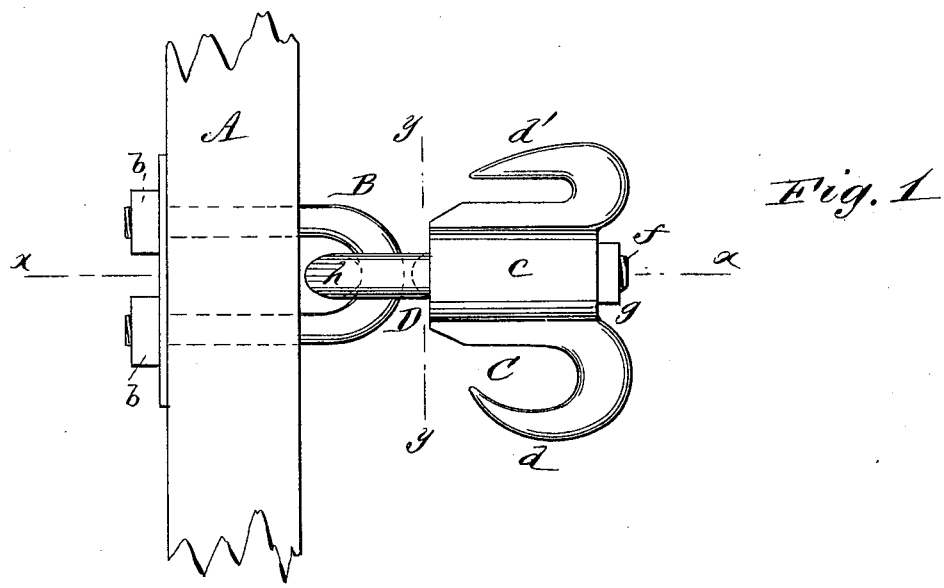
Figure 2:
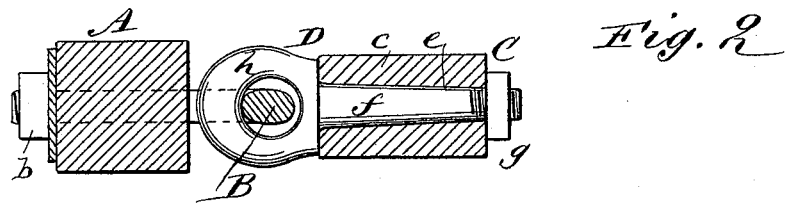
Figure 3:
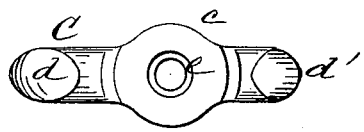

Figure 1 represents a top view or plan of my improved swivel-hook attachment applied to a doubletree, which is shown only in part. Figure 2 is a longitudinal section, mainly upon the line $x\ x$ in Fig. 1, and Fig. 3 a vertical section at right angles to Fig. 2, upon the line $y\ y$ in Fig. 1, with the bolt of the swivel-hook removed.

A is a doubletree, in part, and B the staple to which the swivel-hook C is attached in front of the doubletree, the looped portion of the staple projecting forward and its two arms or legs passing through the doubletree and having screw-threads on their ends, upon which nuts $b\ b$ screw to hold the staple in place and to provide for its detachment when required.

The body $c$ of the swivel-hook C has projecting on opposite sides of it two hooks, $d\ d'$, pointing backward, the one, $d$, being an open hook, and the other, $d'$, a close or grab one. Said body $c$ is constructed with a circular aperture, $e$, longitudinally through it, made tapering in a forward direction to receive within it the correspondingly-tapering circular shank $f$ of the bolt D, upon which the swivel-hook turns. The tapering shank of said bolt and its similarly-shaped bearing in the swivel-hook provides for an easy turning of said compound hook when draft or strain is put upon it. The bolt D is also detachably secured to the body of the swivel-hook by a nut, $g$, fitted to screw upon its forward end, and is constructed in its rear with an eye, $h$, which engages, with freedom to play, with the loop of the staple B. Thus the swivel-hook is not only free to turn upon the bolt D, but said bolt has a loose or independent motion upon the staple, thereby securing to the swivel-hook a universal movement.

This swivel-hook attachment admits of being readily put together and taken apart, and while always ready for the wagon can, by its compound character of an open and close hook and facility of attachment and detachment, be readily hitched to a harrow or any other farming utensil, or aught else requiring to be drawn. Applied to a doubletree, the draft will always be in line with the bolt or its eye, and all lever-like strain or purchase on the bolt is avoided, so that when a team is drawing a heavy load, and the one horse gets ahead of the other, the attachment will be free from that liability to breakage which so commonly occurs when a center clevis is used.

Having thus described my invention, what I claim as new, and desire to secure by Letters Patent, is—

1. The within-described swivel-hook, the same consisting of the swivel-hook C, having a longitudinal tapering interior bearing and exterior close and open hooks, $d\ d'$, on opposite sides of its body, and the tapering detachable circular bolt D, provided with an eye, $h$, on its rear end, as set forth.

2. The combination, with the doubletree A, of the detachable staple B, the swivel-hook C, having exterior open and close hooks, $d\ d'$, on opposite sides of its body, and the eyebolt D, fitted to the body of the hook and arranged to engage with the staple, essentially as shown and described.

WILLIAM A. PETRIE.

Witnesses:
HORACE E. PETRIE,
FLOYD J. WILSON.